2,778,831

Patented Jan. 22, 1957

2,778,831

DYESTUFFS OF THE ANTHRAPYRIMIDINE SERIES

Frank Lodge and James Wardleworth, Blackley, Manchester, England, assignors to Imperial Chemical Industries Limited, a corporation of Great Britain No Drawing. Application October 18, 1954, Serial No. 463,026

Claims priority, application Great Britain October 21, 1953

6 Claims. (Cl. 260—261)

This invention relates to new dyestuffs and more particularly to new acid dyestuffs of the anthrapyrimidine series.

The anthrapyrimidines referred to in this specification are 2-aryl-1′:9′-anthrapyrimidines, that is to say those compounds which contain in their structure the grouping —N=CAr—N=, where Ar is an aryl nucleus, connected to the 1′ and 9′ carbon atoms of the anthraquinone nucleus to form a pyridine ring fused with the anthraquinone residue.

The system of numbering used for anthrapyrimidine derivatives in this specification is that given for the parent ring system in "The Ring Index," 1940, by Patterson and Capell, published by the Rheinhold Publishing Corporation, page 362, No. 2676.

In German specification No. 633,599 a process is described for the manufacture of wool dyestuffs by sulphonating certain antrapyrimidines, including the 6-p-toluidino-2-aryl-1′:9′-anthrapyrimidines where the aryl radical is phenyl, α-naphthyl or β-naphthyl.

The dyestuffs of this kind obtained under mild sulphonation conditions are sparingly soluble in water so that they tend to crystallise out from the dyebath. Furthermore they give dyeings on wool which have poor rubbing fastness. The more soluble dyestuffs obtained under more severe sulphonation conditions are free from these disadvantages but they give dyeings of poor fastness to washing and milling.

We have now found that by introducing at least two sulphonic acid groups into certain 6-arylamino-2-aryl-1′:9′-anthrapyrimidines of high molecular weight, there are obtained scarlet to red acid dyestuffs which have good solubility in the dyebath and also give bright scarlet to red dyeings on wool of excellent wet fastness properties.

According to our invention we provide new acid dyestuffs which in their free acid form are represented by the formula:

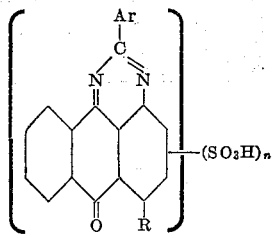

wherein Ar represents an α-naphthyl-, β-naphthyl-, p-phenylphenyl- or p-phenoxyphenyl- radical, R represents an aniline radical carrying in the 4-position a cyclohexyl radical or an alkyl radical containing at least 4 and not more than 12 carbon atoms, or carrying on the 3- and 4-positions a reduced ring, and n is a whole number greater than 1.

According to a further feature of our invention we provide a process for the manufacture of new acid dyestuffs which comprises sulphonating a 6-arylamino-2-aryl-1′:9′-anthrapyrimidine of the formula:

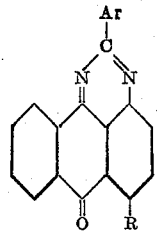

wherein Ar and R have the significance given above to introduce at least 2 sulphonic acid groups into the molecule.

The sulphonation may be carried out for example by stirring the 6-arylamino-2-aryl-1′:9′-anthrapyrimidine in sulphuric acid or oleum at a suitable temperature until a test portion of the reaction mixture is completely soluble in warm water. The product may be isolated by pouring the reaction mixture onto about 3 parts by weight of ice, and water, filtering off the solid product so precipitated stirring this with brine, neutralising with sodium carbonate and filtering off the sodium salt of the dyestuffs.

The starting materials for use in the invention may be made by condensing the appropriate substituted arylamine with the appropriate 6-chloro- or 6-bromo-2-aryl-1′:9′-anthrapyrimidine which itself may be made by condensing the N-methyl derivative of the appropriate aryl carboxylic acid amide with 1-chloro-, or 1-bromo-4-aminoanthraquinone by means of thionyl chloride in the presence of an inert diluent.

Suitable starting materials are for example 6-p-cyclohexylanilino-2-p-phenylphenyl-1′:9′-anthrapyrimidine, 6-p-n-octylanilino-2-p-phenylphenyl-1′:9′- anthrapyrimidine, 6-(ar - tetrahydro-β-naphthylamino)-2 - p - phenylphenyl-1′:9′-anthrapyrimidine, 6-p-n-butylanilino - 2 - p - phenylphenyl-1′:9′-anthrapyrimidine and the corresponding 2-p-phenoxyphenyl-, -2-α-naphthyl- and -2-β-naphthyl compounds.

The dyestuffs made by the process of our invention are normally isolated in the form of their salts, especially the alkali metal salts. They have good solubility in the dyebath and dye wool in bright scarlet to red shades of very good fastness to washing, milling, perspiration and light.

The invention is illustrated but not limited by the following examples in which the parts are by weight:

Example 1

20 parts of 6-p-n-butylanilino-2-p-phenylphenyl 1′:9′-anthrapyrimidine (red crystals, melting point 203–204° C., which may be obtained by condensing p-n-butylaniline with 6-chloro- or 6-bromo-2-p-phenylphenyl-1′:9′-anthrapyrimidine) are dissolved with stirring in 280 parts of 100% sulphuric acid at 20° C. 192 parts of oleum containing 20% of free sulphur trioxide are added, and the solution is stirred at 20° C. until a test portion of the solution is completely soluble in water at 35° C. This requires about 1 hour. The solution is poured onto 1500 parts of ice and water, and the solid product is filtered off and mixed with 10% brine. Sufficient sodium carbonate is added to make the suspension alkaline and the dyestuff is then filtered off from the red suspension, washed on the filter with 10% brine and dried.

The product which is essentially the sodium salt of a disulphonic acid, dissolves in cold water to give a reddish-orange solution, and dyes wool from neutral or weakly acid dyebaths in bright scarlet shades of excellent fastness to wet treatments.

Example 2

20 parts of 6-p-n-butylanilino-2-β-naphthyl-1′:9′-anthrapyrimidine (orange crystals, melting point 212–213° C. which may be obtained by condensing p-n-butylaniline with -6-chloro- or 6-bromo-2-β-naphthyl-1':9'-anthrapyrimidine) are dissolved in 276 parts of 100% sulphuric acid at 20° C. 96 parts of oleum containing 20% of free sulphur trioxide are added and the solution is stirred at 20° C. until a test portion of the solution is completely soluble in cold water. The product is isolated as described in Example 1. It dissolves in cold water to give a reddish-orange solution, and dyes wool from a neutral or weakly acid dyebath in scarlet shades of very good fastness to wet treatments.

*Example 3*

20 parts of 6-p-n-butylanilino-2-p-phenoxyphenyl-1':9'-anthrapyrimidine (red crystals, melting point 158–159° C. which may be made by condensing p-n-butylaniline with 6-chloro-, or 6-bromo-2-p-phenoxyphenyl-1':9'-anthrapyrimidine) are dissolved in 370 parts of 100° sulphuric acid at 10° C. 96 parts of oleum containing 20% of free sulphur trioxide, are added and the solution is stirred at 10° C. until a test portion of the solution is completely soluble in water at 35° C. The dyestuff is isolated as described in Example 1. The red dyestuff so obtained is soluble in cold water to give a reddish-orange solution, which dyes wool from neutral or weakly acid dyebaths in bright scarlet shades of very good fastness to wet treatments.

*Example 4*

20 parts of 6-p-cyclohexylanilino-2-p-phenylphenyl-1':9'-anthrapyrimidine (red crystals, melting point 204–205° C., which may be obtained by condensing p-cyclohexylaniline with 6-chloro- or 6-bromo-2-p-phenylphenyl-1':9'-anthrapyrimidine) are dissolved with stirring in 280 parts of 100% sulphuric acid at 20° C. 100 parts of oleum containing 20% of free sulphur trioxide are added and the mixture is stirred at 20° C. for 16 hours, and then poured into 1,500 parts of ice and water. The solid product is filtered off and the dyestuff is isolated as described in Example 1. The bright red powder so obtained is essentially the sodium salt of a disulphonic acid. It gives a clear scarlet solution in water and dyes wool from neutral or weakly acid dyebaths in bright scarlet shades of very good fastness to washing and light.

Similar scarlet shade wool dyestuffs may be obtained by sulphonating 6-p-n-octylanilino-2-p-phenylphenyl-1':9'-anthrapyrimidine or 6-(ar-tetrahydro β-naphthylamino)-2-p-phenylphenyl-1':9'-anthrapyrimidine.

What we claim is:

1. New acid dyestuffs which in their free acid form are represented by the formula:

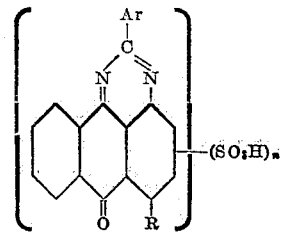

wherein Ar represents a member selected from the group consisting of a-naphthyl-, β-naphthyl-, p-phenylphenyl-, and p-phenoxyphenyl-radicals, R represents a member selected from the group consisting of an aniline radical carrying in the 4-position a cyclohexyl radical, an aniline radical carrying in the 4-position an alkyl radical containing at least 4 and not more than 12 carbon atoms, and an aniline radical carrying on the 3- and 4-positions a reduced ring, and n is a whole number greater than 1 with a sulphonating agent selected from the group consisting of sulfuric acid and oleum until the resulting mixture is completely soluble in water.

2. The acid dyestuff which in its free acid form is 6-p-n-butylanilino-2-p-phenylphenyl-1':9'-anthrapyrimidine-disulphonic acid.

3. Process for the manufacture of new acid dyestuffs which comprises sulphonating by treating a 6-arylamino-2-aryl-1':9'-anthrapyrimidine of the formula:

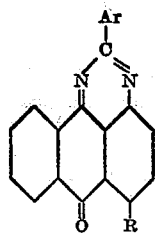

wherein Ar represents a member selected from the group consisting of a-naphthyl-, β-naphthyl-, p-phenylphenyl-, and p-phenoxyphenyl-radicals, R represents a member selected from the group consisting of an aniline radical carrying in the 4-position a cyclohexyl radical, an aniline radical carrying in the 4-position an alkyl radical containing at least 4 and not more than 12 carbon atoms, and an aniline radical carrying on the 3- and 4-positions a reduced ring, and n is a whole number greater than 1 with a sulphonating agent selected from the group consisting of sulfuric acid and oleum until the resulting mixture is completely soluble in water to introduce at least 2 sulphonic acid groups into the molecule.

4. The acid dyestuff which in its free acid form is represented by the formula of claim 1 wherein Ar is (B-naphthyl and R is p-n-butylanilino).

5. The acid dyestuff which in its free acid form is represented by the formula of claim 1 wherein Ar is 2-p-phenoxyphenyl and R is p-n-butylanilino.

6. The acid dyestuff which in its free acid form is represented by the formula of claim 1 wherein Ar is 2-phenylphenyl and R is p-cyclohexylanilino.

References Cited in the file of this patent

UNITED STATES PATENTS

| | | |
|---|---|---|
| 2,068,989 | Koeberle et al. | Jan. 26, 1937 |
| 2,138,381 | Koeberle et al. | Nov. 29, 1938 |
| 2,557,328 | Wardleworth | June 19, 1951 |